Jan. 3, 1928.  1,654,947
V. SYKORA
GEARING FOR TRANSMITTING MOTION FROM DRIVING MEMBERS
TO A PLURALITY OF DRIVEN MEMBERS
Filed March 28, 1921   2 Sheets-Sheet 1

V. Sykora
Inventor

By Marks & Clerk
Attys

Jan. 3, 1928. 1,654,947
V. SYKORA
GEARING FOR TRANSMITTING MOTION FROM DRIVING MEMBERS
TO A PLURALITY OF DRIVEN MEMBERS
Filed March 28, 1921 2 Sheets-Sheet 2
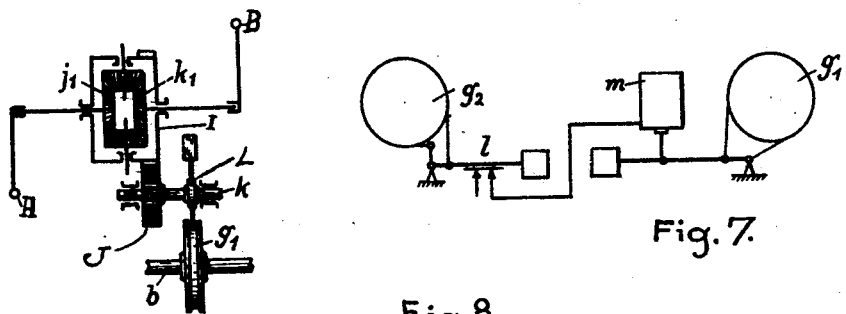
Fig. 6. Fig. 8 Fig. 7.
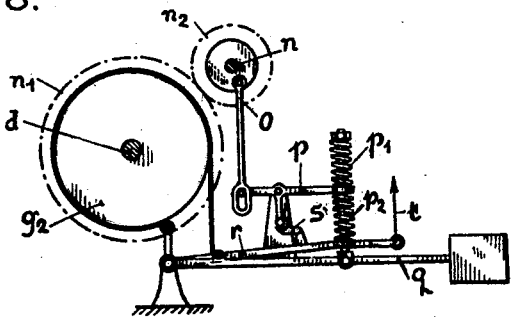
Fig. 9
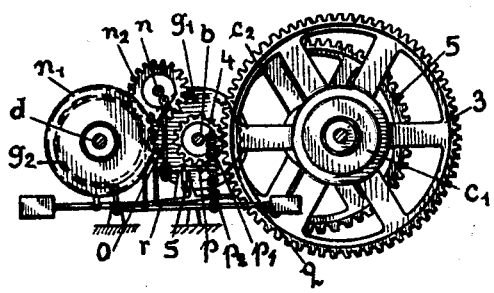
V. Sykora
INVENTOR
By: Marks & Clerk
Attys.

Patented Jan. 3, 1928.

1,654,947

UNITED STATES PATENT OFFICE.

VLADISLAV SÝKORA, OF SMICHOV, CZECHOSLOVAKIA.

GEARING FOR TRANSMITTING MOTION FROM DRIVING MEMBERS TO A PLURALITY OF DRIVEN MEMBERS.

Application filed March 28, 1921, Serial No. 456,196, and in Austria December 20, 1917.

This invention relates to transmission gearing for connecting up a driving member to one or more driven members in which means are provided for coupling up and uncoupling the driven members from the driving member.

The invention has for its object to simplify the construction and ensure the reliability in operation of the gearing, even in cases where large powers are developed, as well as to permit of a standardized construction of the constituent parts of the gearing.

In transmission gears of this type which have previously been proposed the clutches for connecting up the driven members to the driving member and the means for stopping and holding stationary the disconnected driven members have either been operated by a separate source of power, by the working fluid supplied to the driving member or from the driving member itself through the medium of compressed air.

According to the present invention the means for coupling up the driven members to the driving member and for stopping and holding stationary the disconnected driven members are operated from the driving member through mechanical gearing.

The invention is particularly suitable for use in connection with cranes and grab winches but at the same time is capable of being employed in many other fields.

The invention is illustrated by way of example in the accompanying drawings in which:—

Fig. 6 shows a diagrammatic view of a constructional form of bevel wheel differential controlling gear.

Fig. 7 is a diagrammatic view of an electrical controlling gear.

Fig. 8 is an end elevation of a mechanical device for stopping the auxiliary shaft at the right moment.

Fig. 9 is a sectional elevational detail showing the mechanical stopping device applied to the form of the invention as shown in Fig. 1, the section being taken similarly to Fig. 2.

Figure 1:
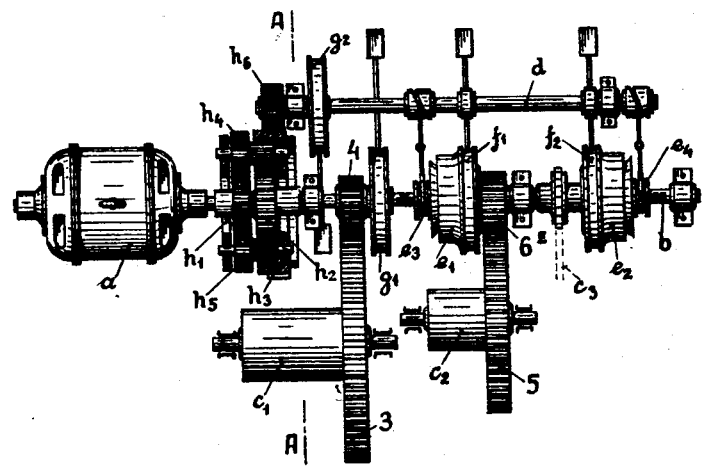
Fig. 1 shows a plan view of a constructional form of the improved transmission gearing in which the power is transmitted from the driving member through the intermediary of a planet gear.
Figure 2:
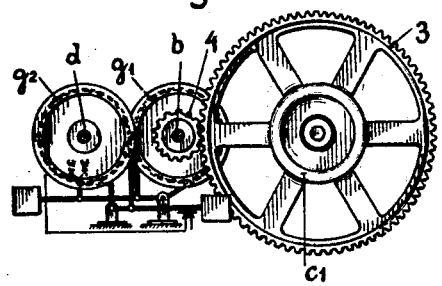
Fig. 2 is a cross-section on the line A—A in Fig. 1.

Referring to the drawings, $a$ represents a driving member which may either be a line shaft or a prime mover. The driving member $a$ is connected up by means of a planet gear to a main shaft $b$ and an auxiliary shaft $d$. In the construction shown in Fig. 1, the drive is transmitted from the driving wheel $h_1$ on the shaft of the driving member by way of the double planet pinions $h_4$, $h_5$ to a gear wheel $h_2$ on the shaft $b$. The planet pinions are rotatably mounted on a planet wheel carrier $h_3$ which is provided with external teeth engaging with a gear wheel $h_6$ on the auxiliary shaft $d$, whereby the drive is transmitted to this shaft. Of course it is to be understood that the planet wheel carrier may be connected up to the auxiliary shaft by means of a chain drive or other suitable gearing according to circumstances, as will be readily understood.

Figure 3:
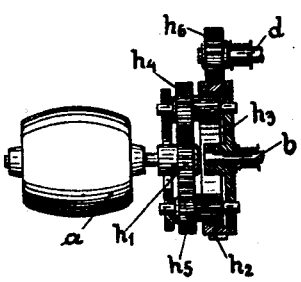
Figs. 3, 4 and 5 are plan views of modified arrangements of planet gears, Figs. 3 and 4 being partly in horizontal section.
Figure 4:
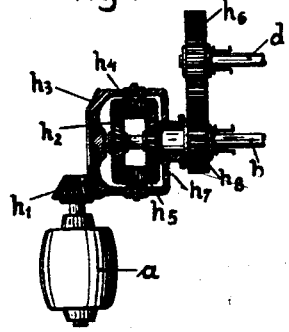

Fig. 3 shows a modified form of planet gear in which the planet wheel carrier $h_3$ is mounted on the shaft $b$. Fig. 4 shows a form of bevel planet gear. The driving wheel $h_1$ on the shaft of the driving member meshes with a ring of teeth on the planet wheel carrier, the planet pinions $h_4$, $h_5$ meshing with the bevel gear wheel $h_2$ on the shaft $b$ and with a bevel gear wheel $h_7$ mounted on one end of a sleeve free to rotate on the shaft $b$, a spur gear wheel $h_8$ meshing with the gear wheel $h_6$ on the shaft $d$ being secured on the other end of the said sleeve.

Figure 5:
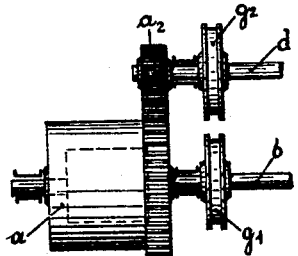

In the construction shown in Fig. 5 the driving member $a$ is a motor, which is capable of revolving round its shaft, the body of the driving member being connected up to the shaft $d$ by means of gear wheels $a_1$, $a_2$, while its shaft is coupled directly to the shaft $b$.

The main shaft $b$ drives the driven members $c_1$, $c_2$, $c_3$, the driven member $c_1$ being permanently connected up to the shaft $b$ by means of the gears, 3, 4. The driven member $c_2$ is connected up by means of gears 5, 6 to a sleeve $e_1$ while the driven member $c_3$ (not shown) is connected up through the intermediary of a gear wheel 7 to a sleeve $e_2$. The sleeves $e_1$, $e_2$ are free to rotate on the shaft $b$ but can be clutched to the shaft by means of clutches $e_3$, $e_4$ respectively, the said sleeves being provided with means $f_1$, $f_2$ respectively for arresting their motion when required. The main and auxiliary shafts are also provided with means $g_1$, $g_2$ respectively, for arresting their motion when required.

The means for stopping and holding stationary the disconnected driven members and the shafts $b$ and $d$ will hereinafter be briefly designated brakes although it is to be understood that other means may be employed for this purpose.

The rotation of the auxiliary shaft from one angular position to the other is effected by disengaging the brake $g_2$ and simultaneously applying the brake $g_1$.

In order to ensure the correct co-operation of the two braking members $g_1$, $g_2$ the mechanism for operating them is interconnected, the operating mechanism of the main shaft brake being actuated simultaneously with the starting and stopping of the driving member. Whether the brake $g_1$ is actually disengaged or not when the driving member is running depends upon the position of the coupling device connecting the operating mechanism of the brake $g_1$ with that of the brake $g_2$.

In the differential wheel gear shown in Fig. 6, the casing I of a planet gear is provided with an external row of teeth which mesh with a gear pinion J on a shaft K provided with a cam L for operating the brake lever of the main shaft brake $g_1$. One of the sun wheels $J_1$ is mounted on the shaft of lever A connected to the auxiliary shaft brake lever, the other sun wheel $K_1$ being mounted on the shaft of the lever B which is connected up to the means for starting and stopping the driving member $a$. The angular motion of the levers A, B is limited in both directions whereby the casing I is caused to rotate when only one of the levers A, B is actuated. The main shaft brake lever is only actuated by the differential gear in one direction, the cam swell on the cam L being unsymmetrical to the plane connecting the axis of the cam disc and the antifriction roller on the brake lever, so that the latter can only be raised by rotation of the shaft in the one direction. When the auxiliary shaft brake mechanism is in the on position and the lever B moved to start the driving member, the casing I will be rotated and the main shaft brake released by the rotation of the cam shaft K. When the lever B is returned to the inoperative position of the driving member or the lever A moved to release the brake $g_2$, the main shaft brake is applied.

In the arrangement shown in Fig. 7 the brake lever of the auxiliary shaft brake $g_2$ co-operates with a switch $l$ which is included in the circuit of an electromagnet $m$ for releasing the main shaft brake $g_1$. This electromagnet is always connected up to the current supply when the driving member $a$ is running and is disconnected therefrom when the driving member is stopped. The switch $l$ is closed when the brake $g_2$ is on, consequently the main shaft brake will only be released when the driving member is running and the auxiliary shaft brake is on.

It is necessary to provide means for bringing the auxiliary shaft to rest after it has rotated into the position corresponding to the required gearing arrangement of the driven members. A mechanical gear for effecting this is shown in Fig. 8, the said gear causing the brake lever of the auxiliary shaft brake to be returned to the on position after the shaft has rotated through a predetermined angle. A shaft $n$ which is driven from the auxiliary shaft through gear wheels $n_1$, $n_2$ is provided with a crank which is coupled by means of a connecting rod $o$ to a three armed lever $p$, the said crank only acting on the three armed lever in one direction. The movement of the lever $p$ is limited by means of stops or as shown is held in its mid-position by means of springs $p_1$, $p_2$. The lever $p$ is connected up to the weighted lever $q$ of the brake $g_2$ (Figure 1) and has one of its arms arranged perpendicular to the lever $q$ and located opposite a uni-directional pawl $s$ mounted on a lever $r$ which constitutes the releasing device for the auxiliary shaft brake. When the lever $r$ is raised the pawl $s$ acting on the perpendicular arm of the lever $p$ raises it together with the lever $q$ and the auxiliary shaft brake is released. The connecting rod $o$ does not prevent this movement because the arm of the lever $p$ to which it is connected engages it loosely by means of a pin and slot connection, the pin on the three armed lever being adapted to slide along the slot in the connecting rod. When the driving member is coupled up to the auxiliary shaft the rotation of the latter raises the crank pin whereby the lower end of the slot in the connecting rod comes into engagement with the pin of the lever $p$ thereby compressing the lower spring $p_2$ on the other end of the lever, while the fulcrum of $p$ on the lever $q$ remains stationary. The arrangement is such that before the crank pin has reached its highest position the lever $p$ will have rocked to such an extent that it will be out of engagement with the pawl $s$ and the lever $q$ will tend to fall by its weight and apply the brake $g_2$, the spring $p_2$ being still further compressed. The lever $q$ is prevented from returning the brake $g_2$ to its on position owing to its being supported by the connecting rod $o$ and only when the crank has returned to its lower dead centre position will the brake be fully applied. During this operation the lever $r$ together with the pawl $s$ remains in its highest position (not shown in the drawing). When the lever $r$ is lowered again the pawl *s* yields and again comes into engagement with the lever *p*.

What I claim is:—

1. Transmission mechanism for connecting up a driving member to a number of driven members, comprising in combination a main shaft, an auxiliary shaft, planetary gearing for transmitting the motion of the driving member to said main and auxiliary shafts, gearing permanently connecting one of the driven members to the main shaft, other gearing between the main shaft and the remaining driven members, clutches provided on the main shaft associated with the last mentioned gearing for connecting up the corresponding driven members to the main shaft, and means operable from the auxiliary shaft for stopping and holding stationary the last mentioned driven members when disconnected from the main shaft, substantially as and for the purposes set forth.

2. Transmission gearing for connecting up a driving member to a number of driven members, comprising in combination a main shaft, an auxiliary shaft, planetary gearing for transmitting the motion of the driving member to the said main and auxiliary shafts, gearing permanently connecting one of the driven members to the main shaft, other gearing between the remaining driven members and the main shaft, clutches provided on the said main shaft and asssociated with the last mentioned gearing for connecting up the corresponding driven members to the main shaft, means provided on the said main shaft for stopping and holding stationary the last mentioned driven members when disconnected from the main shaft, means provided on the said auxiliary shaft for actuating the clutches and stopping means, respectively provided on the main shaft and means for stopping the one shaft so that the other shaft will be driven by the planetary gearing.

3. Transmission gearing for connecting up a driving member to a number of driven members, comprising in combination a main shaft, an auxiliary shaft, planetary gearing for transmitting the motion of the driving member to the said main and auxiliary shafts, gearing permanently connecting one of the driven members to the main shaft, other gearing between the remaining driven members and the main shaft, clutches provided on the said main shaft and associated with the last mentioned gearing for connecting up the corresponding driven members to the main shaft, means provided on the said main shaft for stopping and holding stationary the last mentioned driven members when disconnected from the main shaft, means provided on the said auxiliary shaft for actuating the clutches and stopping means, respectively, provided on the main shaft, means for stopping the one shaft so that the other shaft will be driven by the planetary gearing and means connected to the starting and stopping gear of the driving member, for applying the means for stopping the one shaft when the means for stopping the other shaft is released.

4. Transmission gearing as claimed in claim 2, having means for bringing the auxiliary shaft to rest after it has rotated into the position corresponding to the required gearing arrangement of the driven members.

5. Transmission gearing for connecting up a driving member to a number of driven members, comprising in combination a main shaft, an auxiliary shaft, planetary gearing for transmitting the motion of the driving member to the said main and auxiliary shafts, gearing permanently connecting one of the driven members to the main shaft, other gearing between the remaining driven members and the main shaft, clutches provided on the said main shaft and associated with the last mentioned gearing for connecting up the corresponding driven members to the main shaft, means provided on the said main shaft for stopping and holding stationary the last mentioned driven members when disconnected from the main shaft, means provided on the said auxiliary shaft for actuating the clutches and stopping means, respectively, provided on the main shaft, means for stopping the one shaft so that the other shaft will be driven by the planetary gearing, a loaded lever for applying the auxiliary shaft stopping means, a crankshaft driven from the auxiliary shaft, a connecting rod, a three armed lever coupled to the said crankshaft by the said connecting rod, the said three armed lever being pivoted on the said loaded lever, means for limiting the motion of the said three armed lever, means for releasing the auxiliary shaft stopping means, the said means comprising a lever and a pawl provided on the said lever, the said pawl being intended to actuate the said three armed lever in one direction, whereby after the auxiliary shaft stopping means has been released and the auxiliary shaft has rotated through a predetermined angle the former is automatically applied again so as to stop the shaft.

In testimony whereof I have signed my name to this specification.

VLADISLAV SÝKORA.